United States Patent
Lei et al.

(10) Patent No.: US 12,536,621 B2
(45) Date of Patent: Jan. 27, 2026

(54) APPARATUS AND METHODS FOR GENERATING DENOISING MODEL

(71) Applicant: ASML Netherlands B.V., Veldhoven (NL)

(72) Inventors: Hairong Lei, San Jose, CA (US); Wei Fang, Milpitas, CA (US)

(73) Assignee: ASML Netherlands B.V., Veldhoven (NL)

( * ) Notice: Subject to any disclaimer, the term of this patent is extended or adjusted under 35 U.S.C. 154(b) by 388 days.

(21) Appl. No.: 18/154,621

(22) Filed: Jan. 13, 2023

(65) Prior Publication Data

US 2023/0230208 A1 Jul. 20, 2023

Related U.S. Application Data

(63) Continuation of application No. PCT/EP2021/067268, filed on Jun. 24, 2021.

(60) Provisional application No. 63/051,500, filed on Jul. 14, 2020.

(51) Int. Cl.
*G06T 5/70* (2024.01)

(52) U.S. Cl.
CPC ...... *G06T 5/70* (2024.01); *G06T 2207/10061* (2013.01); *G06T 2207/20081* (2013.01); *G06T 2207/20084* (2013.01)

(58) Field of Classification Search
CPC ............. G06T 5/70; G06T 2207/10061; G06T 2207/20081; G06T 2207/20084
USPC ........................................................ 382/155
See application file for complete search history.

(56) References Cited

U.S. PATENT DOCUMENTS

| | | | |
|---|---|---|---|
| 5,229,872 A | 7/1993 | Mumola | |
| 6,046,792 A | 4/2000 | Van Der Werf et al. | |
| 10,043,261 B2 | 8/2018 | Bhaskar et al. | |
| 2009/0157360 A1 | 6/2009 | Ye et al. | |
| 2017/0148226 A1 | 5/2017 | Zhang et al. | |
| 2018/0330511 A1 | 11/2018 | Ha et al. | |

FOREIGN PATENT DOCUMENTS

| | | |
|---|---|---|
| JP | 2012059118 A | 3/2012 |
| JP | 2019-8599 A | 1/2019 |
| JP | 2019129169 A | 8/2019 |
| TW | 201740349 A | 11/2017 |
| TW | 201945829 A | 12/2019 |

(Continued)

OTHER PUBLICATIONS

Minh Quan, Tran, et al. "Removing imaging artifacts in electron microscopy using an asymmetrically cyclic adversarial network without paired training data." Proceedings of the IEEE/CVF International Conference on Computer Vision Workshops. 2019. (Year: 2019).*

(Continued)

*Primary Examiner* — Jonathan S Lee
(74) *Attorney, Agent, or Firm* — FINNEGAN, HENDERSON, FARABOW, GARRETT & DUNNER LLP

(57) ABSTRACT

Described herein is a method for training a denoising model. The method includes obtaining a first set of simulated images based on design patterns. The simulated images may be clean and can be added with noise to generate noisy simulated images. The simulated clean and noisy images are used as training data to generate a denoising model.

19 Claims, 15 Drawing Sheets

(56) References Cited

FOREIGN PATENT DOCUMENTS

TW    202001230 A    1/2020

OTHER PUBLICATIONS

Giannatou, E., et al. "Deep learning denoising of SEM images towards noise-reduced LER measurements." Microelectronic Engineering 216 (2019): 111051. (Year: 2019).*

Byeongyong Ahn, et al., "Block-Matching Convolutional Neural Network for Image Denoising", Journal of Latex Class Files, vol. 6, No. 1, Jan. 2007, arXiv:1704.00524v1 [cs.CV] Apr. 3, 2017 (12 pages).

Steve Bako, et al., "Kernel-Predicting Convolutional Networks for Denoising Monte Carlo Renderings", ACM Transactions on. Graphics, vol. 36, No. 4, Article, 97, Jul. 2017 (14 pages).

Subarna Tripathi, et al., "Correction by Projection: Denoising Images with Generative Adversarial Networks", arXiv preprint arXiv:1803.04477v1 [cs.CV] Mar. 12, 2018 (6 pages).

Liangjiang Yu et al., "SEM image quality enhancement: an unsupervised deep learning approach", Proc. SPIE 11325, Metrology, Inspection, and Process Control for Microlithography XXXIV, 1132527 (Mar. 20, 2020); doi: 10.1117/12.2552883 (10 pages).

Pang, Linyong et al., "Making digital twins using the Deep Learning Kit (DLK)", Photomask Technology 2019, p. 9, Proc. of SPIE vol. 11148.

International Search Report issued in related Foreign Application No. PCT/EP2021/067268; mailed Oct. 1, 2021 (3 pgs.).

Office Action of the Intellectual Property Office of Taiwan issued in related Taiwanese Patent Application No. 110124273; mailed Apr. 14, 2022 (6 pgs.).

Office Action of the Intellectual Property Office of Taiwan issued in related Taiwanese Patent Application No. 110124273; mailed Aug. 3, 2022 (16 pgs.).

Narendra Chaudhary et al., "Deep Supervised Learning to Estimate True Rough Line Images from SEM Images", Proc. SPIE 10775, 34th European Mask and Lithography Conference, 107750R (Sep. 19, 2018); doi: 10.1117/12.2324341.

Hao-Chiang Shao et al: "From IC Layout to Die Photo: A CNN-Based Data-Driven Approach", arxiv.org, Cornell University Library, 201 Olin Library Cornell University Ithaca, NY 14853, Feb. 11, 2020 (Feb. 11, 2020).

\* cited by examiner

APPARATUS AND METHODS FOR GENERATING DENOISING MODEL

CROSS-REFERENCE TO RELATED APPLICATIONS

This application claims priority to International Application No. PCT/EP2021/067268, filed Jun. 24, 2021, which claims priority of U.S. application 63/051,500 which was filed on 14 Jul. 2020. The contents of these applications are incorporated herein by reference in their entireties.

TECHNICAL FIELD

The description herein relates generally to processing images acquired by an inspection or measurement tool, and more particularly, related to image denoising by using machine learning.

BACKGROUND

A lithographic projection apparatus can be used, for example, in the manufacture of integrated circuits (ICs). In such a case, a patterning device (e.g., a mask) may contain or provide a pattern corresponding to an individual layer of the IC ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic projection apparatus, one target portion at a time. In one type of lithographic projection apparatuses, the pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic projection apparatus will have a reduction ratio M (e.g., 4), the speed F at which the substrate is moved will be 1/M times that at which the projection beam scans the patterning device. More information with regard to lithographic devices as described herein can be gleaned, for example, from U.S. Pat. No. 6,046,792, incorporated herein by reference.

Prior to transferring the pattern from the patterning device to the substrate, the substrate may undergo various procedures, such as priming, resist coating and a soft bake. After exposure, the substrate may be subjected to other procedures ("post-exposure procedures"), such as a post-exposure bake (PEB), development, a hard bake and measurement/inspection of the transferred pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical and/or nanoimprint lithography using a patterning device in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc.

SUMMARY

According to some embodiments, there is provided a method for training an image denoising model for processing images. The method includes converting design patterns to a first set of simulated images; and training the denoising model based on the first set of simulated images and image noise.

After training, the denoising model is operable to remove noise from input images and produces denoised images.

In some embodiments, there is provided a system including e-beam optics configured capture an image of a patterned substrate; and one or more processors configured to generate a denoised image of an input image. The one or more processor configured to execute a trained model configured to generate a simulated image from a design pattern for the substrate. In some embodiments, the one or more processor is configured execute a denoising model using the captured image as input to generate a denoised image of the patterned substrate.

In some embodiments, there is provided one or more non-transitory computer-readable media for storing a denoising model. In some embodiments, one or more non-transitory computer-readable media is configured to generate a denoised image via the stored denoising model. In particular, one or more non-transitory computer-readable media stores instructions that, when executed by one or more processors, provides the denoising model. In some embodiments, the denoising model being produced by execute instruction for: obtaining a first set of simulated images based on design patterns (e.g., by using a trained GAN to convert GDS patterns into simulated images); providing the first set of simulated images as input to a base denoising model to obtain a second set of simulated images, the second set of simulated images being denoised images associated with the design patterns; and using reference denoised images as feedback to update one or more configurations of the base denoising model, wherein the one or more configurations are updated based on a comparison between the reference denoised images and the second set of simulated images.

In some embodiments, a GAN is trained to convert GDS pattern images into simulated clean SEM images. Noise features are extracted from scanned SEM images first and then the noise is added to these clean images to generated simulated noisy images. The simulated clean mages and noisy images, in combination with scanned SEM images, are used to train a denoising model. The denoising model may be further fine-tuned with captured SEM images. Once trained, the denoising model is operable to remove noises from input SEM images to generate denoised images.

According to embodiments of the present disclosure, a denoising model is trained by using simulated images that are converted from design patterns through a generator model as described above. Training data comprising such simulated images can collectively cover remarkably and sufficiently more patterns than SEM-captured images. As a result of the improved pattern coverage, the training can advantageously result in significantly improved effectiveness and accuracy of the denoising model.

The requirement for retraining can be far reduced or even eliminated.

BRIEF DESCRIPTION OF THE DRAWINGS

The above aspects and other aspects and features will become apparent to those ordinarily skilled in the art upon review of the following description of specific embodiments in conjunction with the accompanying figures, wherein.

DETAILED DESCRIPTION

Figure 1:
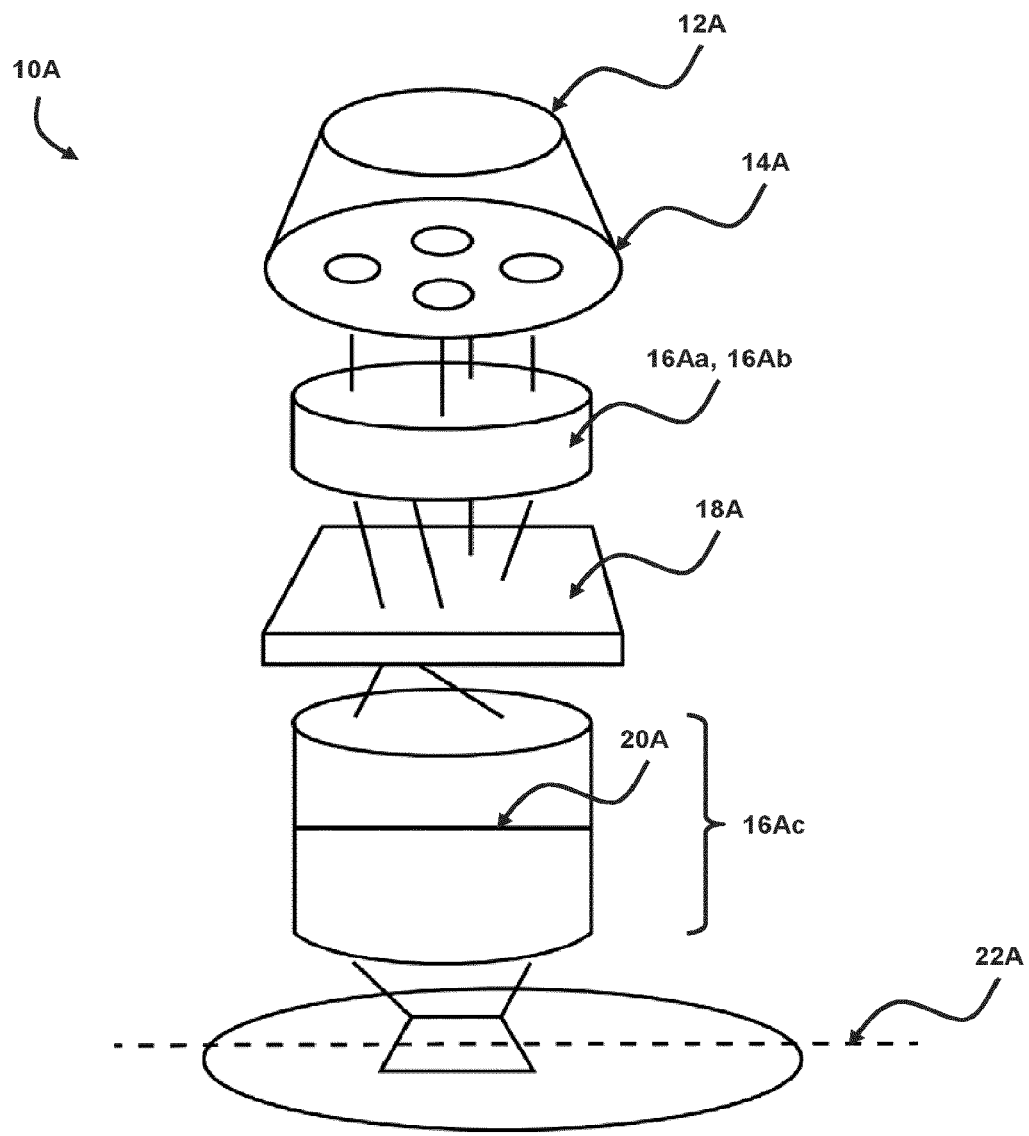
FIG. 1 shows a block diagram of various subsystems of a lithography system, according to some embodiments.

Before describing embodiments in detail, it is instructive to present an example environment in which embodiments may be implemented.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" may be used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The patterning device can comprise, or can form, one or more design layouts. The design layout can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between devices (such as gates, capacitors, etc.) or interconnect lines, so as to ensure that the devices or lines do not interact with one another in an undesirable way. One or more of the design rule limitations may be referred to as "critical dimension" (CD). A critical dimension of a device can be defined as the smallest width of a line or hole or the smallest space between two lines or two holes. Thus, the CD determines the overall size and density of the designed device. Of course, one of the goals in device fabrication is to faithfully reproduce the original design intent on the substrate (via the patterning device).

The pattern layout design may include, as an example, application of resolution enhancement techniques, such as optical proximity corrections (OPC). OPC addresses the fact that the final size and placement of an image of the design layout projected on the substrate will not be identical to, or simply depend only on the size and placement of the design layout on the patterning device. It is noted that the terms "mask", "reticle", "patterning device" are utilized interchangeably herein. Also, person skilled in the art will recognize that, the term "mask," "patterning device" and "design layout" can be used interchangeably, as in the context of RET, a physical patterning device is not necessarily used but a design layout can be used to represent a physical patterning device. For the small feature sizes and high feature densities present on some design layout, the position of a particular edge of a given feature will be influenced to a certain extent by the presence or absence of other adjacent features. These proximity effects arise from minute amounts of radiation coupled from one feature to another or non-geometrical optical effects such as diffraction and interference. Similarly, proximity effects may arise from diffusion and other chemical effects during post-exposure bake (PEB), resist development, and etching that generally follow lithography.

In order to increase the chance that the projected image of the design layout is in accordance with requirements of a given target circuit design, proximity effects may be predicted and compensated for, using sophisticated numerical models, corrections or pre-distortions of the design layout. The article "Full-Chip Lithography Simulation and Design Analysis—How OPC Is Changing IC Design", C. Spence, Proc. SPIE, Vol. 5751, pp 1-14 (2005) provides an overview of current "model-based" optical proximity correction processes. In a typical high-end design almost every feature of the design layout has some modification in order to achieve high fidelity of the projected image to the target design. These modifications may include shifting or biasing of edge positions or line widths as well as application of "assist" features that are intended to assist projection of other features.

An assist feature may be viewed as a difference between features on a patterning device and features in the design layout. The terms "main feature" and "assist feature" do not imply that a particular feature on a patterning device must be labeled as one or the other.

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means.

a programmable LCD array. An example of such a construction is given in U.S. Pat. No. 5,229,872, which is incorporated herein by reference.

As a brief introduction, FIG. 1 illustrates an exemplary lithographic projection apparatus 10A. Major components are a radiation source 12A, which may be a deep-ultraviolet excimer laser source or other type of source including an extreme ultra violet (EUV) source (as discussed above, the lithographic projection apparatus itself need not have the radiation source), illumination optics which, e.g., define the partial coherence (denoted as sigma) and which may include optics 14A, 16Aa and 16Ab that shape radiation from the source 12A; a patterning device 18A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=n sin (Θmax), wherein n is the refractive index of the media between the substrate and the last element of the projection optics, and Omax is the largest angle of the beam exiting from the projection optics that can still impinge on the substrate plane 22A.

In a lithographic projection apparatus, a source provides illumination (i.e. radiation) to a patterning device and projection optics direct and shape the illumination, via the patterning device, onto a substrate. The projection optics may include at least some of the components 14A, 16Aa, 16Ab and 16Ac. An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in U.S. Patent Application Publication No. US 2009-0157360, the disclosure of which is hereby incorporated by reference in its entirety. The resist model is related only to properties of the resist layer (e.g., effects of chemical processes which occur during exposure, PEB and development). Optical properties of the lithographic projection apparatus (e.g., properties of the source, the patterning device and the projection optics) dictate the aerial image. Since the patterning device used in the lithographic projection apparatus can be changed, it may be desirable to separate the optical properties of the patterning device from the optical properties of the rest of the lithographic projection apparatus including at least the source and the projection optics.

Although specific reference may be made in this text to the use of lithography apparatus in the manufacture of ICs, it should be understood that the lithography apparatus described herein may have other applications, such as the manufacture of integrated optical systems, guidance and detection patterns for magnetic domain memories, liquid-crystal displays (LCDs), thin film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist) or a metrology or inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

The terms "radiation" and "beam" used herein encompass all types of electromagnetic radiation, including ultraviolet (UV) radiation (e.g. having a wavelength of 365, 248, 193, 157 or 126 nm) and extreme ultra-violet (EUV) radiation (e.g. having a wavelength in the range of 5-20 nm), as well as particle beams, such as ion beams or electron beams.

Existing training methods for a denoising model requires a large number of images (e.g., SEM images) of a patterned substrate as training data. In such training methods, pattern coverage of design layout is limited to the patterns of the SEM images. In some embodiments, pattern coverage refers to number of unique patterns within a design layout. Typically, a design layout may have hundreds of millions to billions of patterns, and millions of unique patterns. Measuring millions of patterns on a patterned substrate for training purpose is impractical, as it will require substantial amount of metrology time and computing resources for training. As such, for example, training data comprising the SEM images is usually far less than adequate for training a machine learning model. Hence, retraining the trained model with new patterns in real-time may be required.

The methods of the present disclosure have several advantages. For example, pattern coverage of design layout can be increased substantially during offline training Only limited SEM images (e.g., 10-20 real SEM images) can be used e.g., for training and verification purposes. After training, the trained model can be used at runtime to denoise captured metrology images (e.g., SEM images). As relatively large numbers of patterns are covered during the training, the amount of retraining of the present model will be substantially less than existing models. The fine-tuning of the model can be achieved quickly e.g., by acquiring 10-20 real SEM images. As such, a substantial machine scanning time and online model training time can be saved compared to existing models. For example, with the present method, scanning time can be limited to 20 SEM images as opposed to thousands of SEM images and online model training time can be limited to approximately 0.5 hour compared to 4-8 hours.

Figure 2:
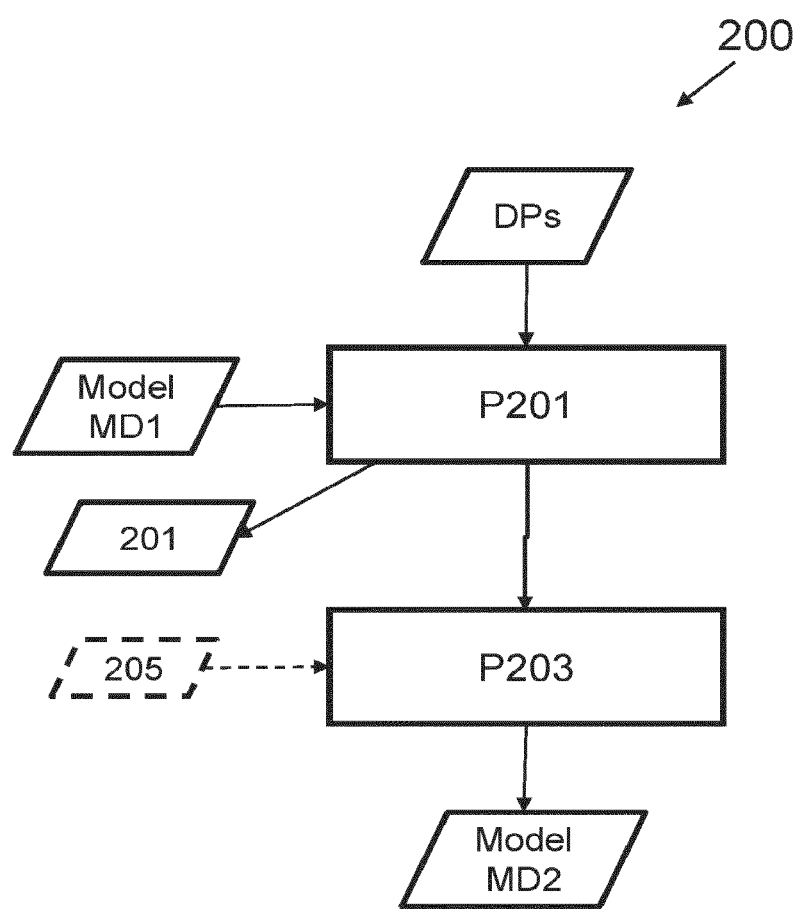
FIG. 2 is a method for training a denoising model, according to some embodiments.

FIG. 2 is an exemplary method 200 of training a denoising model according to some embodiments of the present disclosure. In some embodiments, for training purposes, another model is used to convert design patterns (e.g., design layout in GDS file data) into simulated clean SEM images. Further, noise may be added to these clean images to generate simulated noisy images. The simulated clean images and noisy images, in combination with scanned SEM images, are used to train a denoising model. In some embodiments, the method includes processes P201 and P203 discussed in detail below.

Process P201 includes converting design patterns to a first set of simulated images 201, for example simulated SEM images. In some embodiments, the design patterns DPs are in Graphic Data Signal (GDS) file format. For example, a design layout including millions of design patterns is represented as a GDS data file.

In some embodiments, the obtaining the first set of simulated images 201 includes executing a trained model MD1 using the design patterns DPs as an input to generate the simulated images 201. In some embodiments, the trained model MD1 is trained based on the design patterns DPs and captured images of a patterned substrate, each captured image being associated with a design pattern. In some embodiments, the captured images are SEM images are acquired via a scanning electron microscope (SEM) (e.g., FIGS. 10-11).

In some embodiments, the trained model MD1 can be any model such as a machine learning model that can be trained using existing training methods using training data as discussed herein. For example, the trained model MD1 can be a convolutional neural network (CNN) or a deep convolutional neural network (DCNN). The present disclosure is not limited to a particular training method or a particular neural network. As an example, the model MD1 may be a first deep leaning model (e.g., DCNN) trained using a training method such as generative adversarial network (GAN), wherein the design patterns DPs and SEM images are used as training data. In this example, the trained model MD1 (e.g., DCNN) is referred as a generative model configured to generate the simulated SEM image from a given design pattern, e.g., a GDS pattern.

In some embodiments, a generative adversarial network (GAN) includes two deep learning model—a generator model (e.g., CNN, or DCNN) and a discriminator model (e.g., another CNN or another DCNN) trained together, particularly in opposition to one another. The generator model can take as input the design patterns DPs and the captured images (e.g., SEM images) and output a simulated image (e.g., simulated SEM image). In some embodiments, the outputted simulated images may be labelled as fake images or real images. In an example, a fake image is an image of a certain class (e.g., denoised image of SEM image) that never actually existed before. On the other hand, a real image used as reference (or ground truth) is a previously existing image (e.g., SEM of a printed substrate) that may be used during the training of the generator model and the discriminator model. The goal of the training is to train the generator model to generate fake images that closely resemble the real image. For example, the features of the fake image are at least 95% match with the features of the real image (e.g., denoised SEM image). Consequently, the trained generator model is capable of generating realistic simulated images with high level of accuracy.

In some embodiments, the generator model (G) may be a convolutional neural network. The generator model (G) takes as input the design patterns (z) and generate an image. In some embodiments, the image may be referred as fake image or a simulated image. The fake image can be expressed as Xfake=G(z). The generator model (G) may be associated with a first cost function. The first cost function enables tuning of parameters of the generator model such that the cost function is improved (e.g., maximized or minimized). In some embodiments, the first cost function comprises a first log-likelihood term that determines a probability that the simulated image is a fake image given the input vector.

An example of the first cost function can be expressed by equation 1 below:

$$L_s = E[\log P(S=\text{fak}|X_{fake})] \quad (1)$$

In above equation 1, a log likelihood of conditional probability is computed. In the equation, S refers to a source assignment as fake by the discriminator model and Xfake is an output i.e., a fake image of the generator model. Thus, in some embodiments, the training method minimizes the first cost function (L). Consequently, the generator model will generate fake images (i.e., the simulated images) such that the conditional probability that the discriminator model will realize the fake image as fake is low. In other words, the generator model will progressively generate more and more realistic images or patterns.

Figure 4:
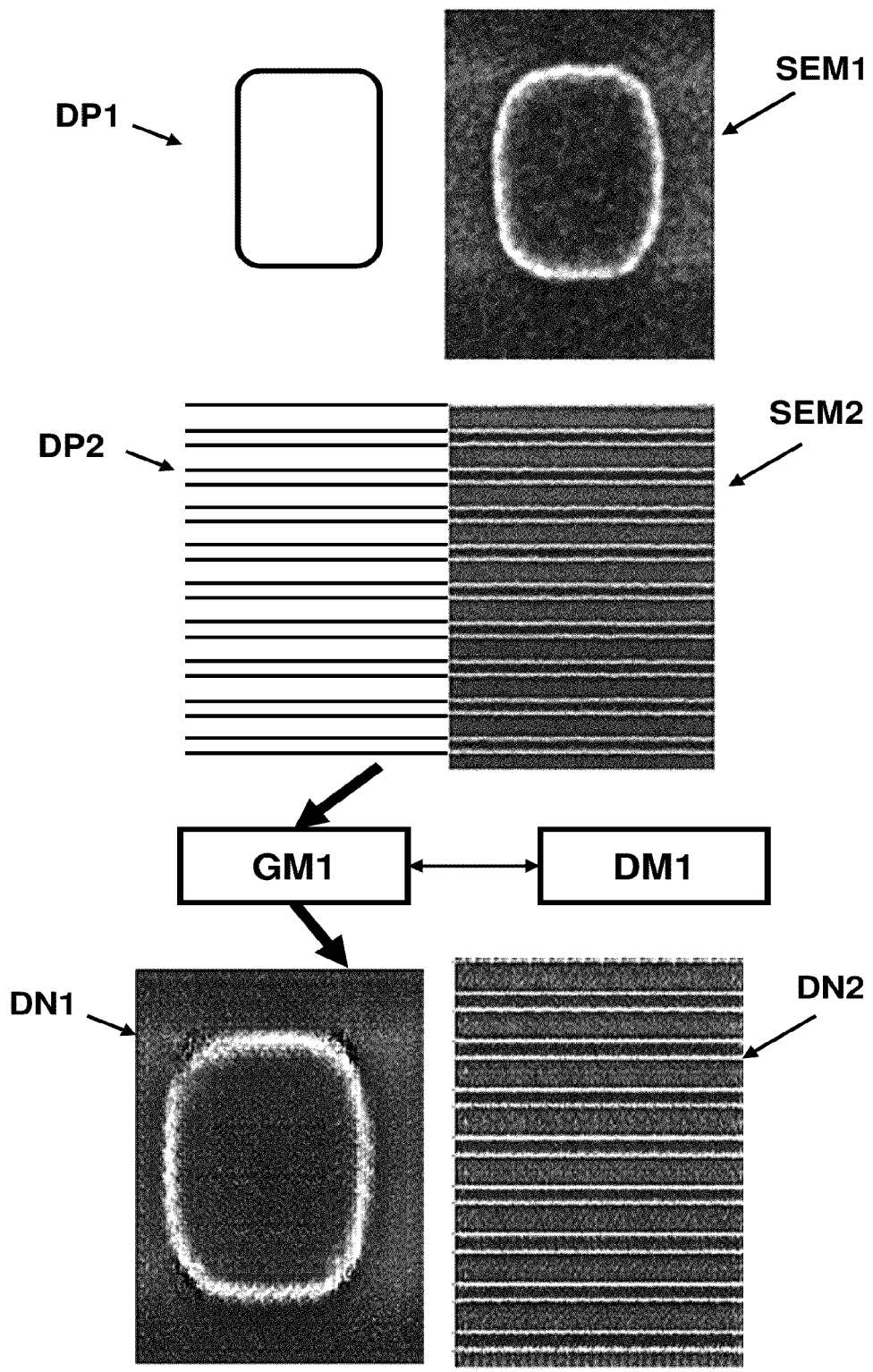
FIG. 4 illustrates example of training a model, according to some embodiments.

FIG. 4 illustrates an exemplary process of training a model (e.g., MD1) as discussed in the process P201. In some embodiments, the trained generator model MD1 is trained using a generative adversarial network. Training based on the generative adversarial network comprises two deep learning model GM1 and DM1 trained together such that a generator model GM1 progressively generates more accurate and robust results.

In some embodiments, the generator model GM1 can take as input, for example, a design patterns DP1 and DP2, and SEM images SEM1 and SEM2 corresponding to the design patterns DP1 and DP2. The generator model GM1 outputs simulated images such as images DN1 and DN2.

The simulated images of GM1 are received by a discriminator model DM1, which is another CNN. The discriminator model DM1 also receives the real images SEM1 and SEM2 (or a set of real patterns) in the form of a pixelated image. Based on the real images, the discriminator model DM1 determines whether the simulated images are fake (e.g., label L1) or real (e.g., label L2) and assigns labels accordingly. When the discriminator model DM1 classifies the simulated images as fake, parameters (e.g., biases and weights) of the GM1 and DM1 are modified based on a cost function (e.g., the first cost function above). The models GM1 and DM1 are iteratively modified until the discriminator DM1 consistently classifies the simulated images generated by GM1 as real. In other words, the generator model GM1 is configured to generate realistic SEM images for any input design patterns.

Figure 5:
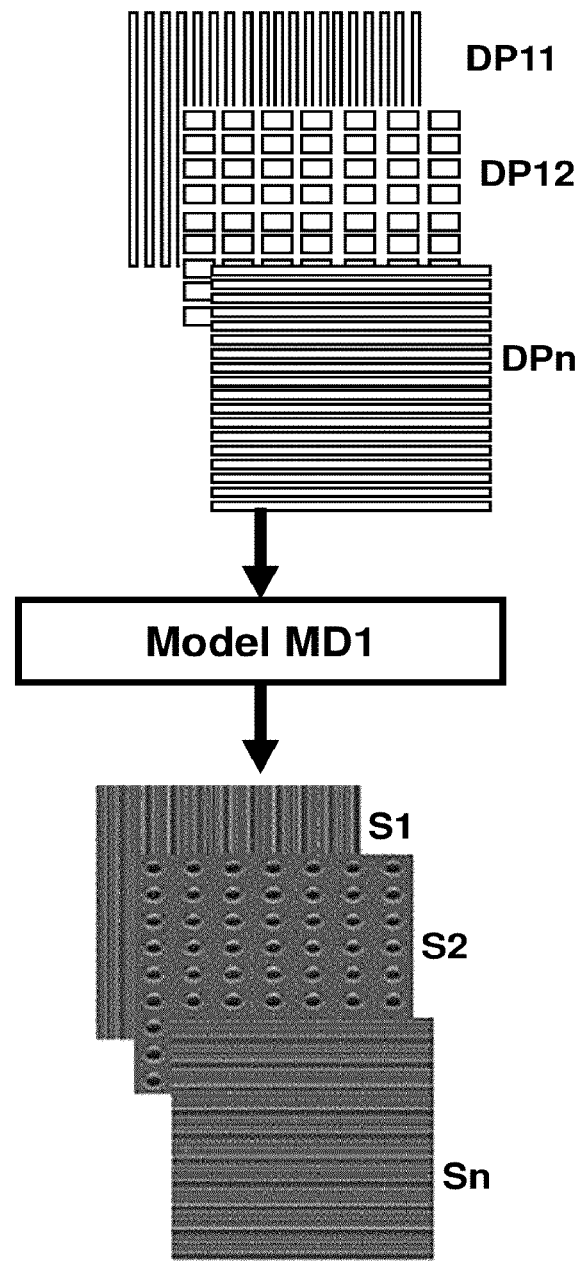
FIG. 5 illustrates example of obtaining the first set of simulated SEM images using the trained model of FIG. 4, according to some embodiments.

FIG. 5 illustrates example of obtaining the first set of simulated SEM images using the trained generator model MD1 of FIG. 4, according to some embodiments. In some embodiments, any design pattern DP11, DP12, DPn can be inputted to the trained generator model MD1 to generate the simulated SEM images S1, S2, Sn, respectively. Although the present disclosure is not limited thereto, these simulated SEM images S1, S2, Sn may be clean images that do not include typical noise or includes very low noise.

Figure 6:
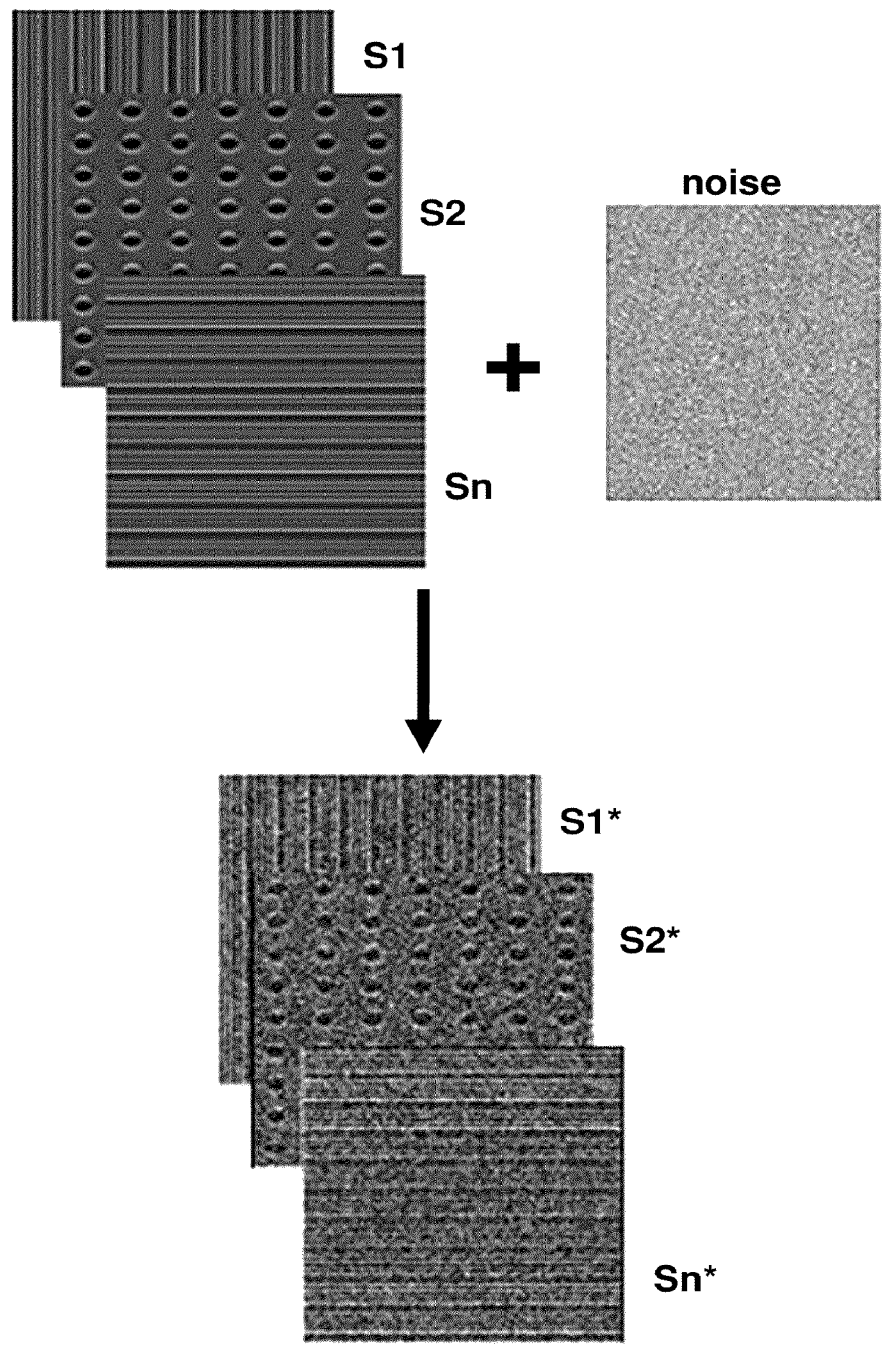
FIG. 6 illustrates an example of adding noise to the simulated SEM images of FIG. 5, according to some embodiments.

In some embodiments, an image noise may be added to generate the first set of simulated images 201 in FIG. 2. FIG. 6 illustrates an example of adding noise to the simulated SEM images S1, S2, Sn to generate the first set of simulated images S1*, S2*, Sn* for training a denoising model which is another machine learning model configured to denoise an input image. The training of the denoising model is discussed with respect to process P203 below.

Process P203 includes training the denoising model uses the first set of simulated images 201 and image noise as training data. In some embodiments, additionally, captured images 205 of a patterned substrate may be included in the training data. For example, the captured images 205 can be SEM images of the patterned substrate.

In some embodiments, the denoising model MD2 is a second machine leaning model. For example, the second machine learning model may be a second CNN or a second DCNN. The present disclosure is not limited to particular deep learning training method or machine learning training methods. In some embodiments, the training is an iterative process performed until the second set of simulated images are within a specified threshold of ground truth such as the first set of simulated images 201 (e.g., simulated SEM images S1, S2, . . . Sn of FIG. 5) before adding noise, or reference images. In some embodiments, the training of the denoising model using the first set of simulated image, the image noise, and captured images as training data In some embodiments, the image noise is extracted from captured images of the patterned substrate, e.g., captured SEM images. For example, a noise filter may be applied to extract the noise from a SEM image captured by the SEM tool. The extract noise can be represented as the image noise. In some embodiments, the image noise is a Gaussian noise, white noise, salt and paper noise characterized by user specified parameters. In some embodiments, the image noise includes pixels whose intensity values are statistically independent from each other. In some embodiments, the Gaussian noise can be generated by varying parameters of a Gaussian distribution function.

In some embodiments, referring to FIG. 6, the image noise such as the Gaussian noise can be added to, for example, simulated images S1, S2, Sn to generate the noisy images such as S1*, S2*, . . . ,Sn*. The noisy images are the first set of simulated images 201 used to train the denoising model.

Conventionally, a denoising model is trained by using captured SEM images as training images. Limited by imaging throughput of SEM systems and so by the quantity of the SEM-captured images, the training images collectively can only cover a relatively small number of patterns, which renders the trained denoising model ineffective in denoising input images that may have a wide range patterns. Undesirably, a trained denoising model needs to be retrained to be able to process images with new patterns. According to embodiments of the present disclosure, a denoising model is trained by using simulated images that are converted from design patterns through a generator model as described above. Training data comprising simulated images can collectively cover remarkably and sufficiently more patterns than SEM-captured images. As a result of the improved pattern coverage, the training can advantageously result in significantly improved effectiveness and accuracy of the denoising model. The requirement for retraining can be far reduced or even eliminated.

Figure 7:
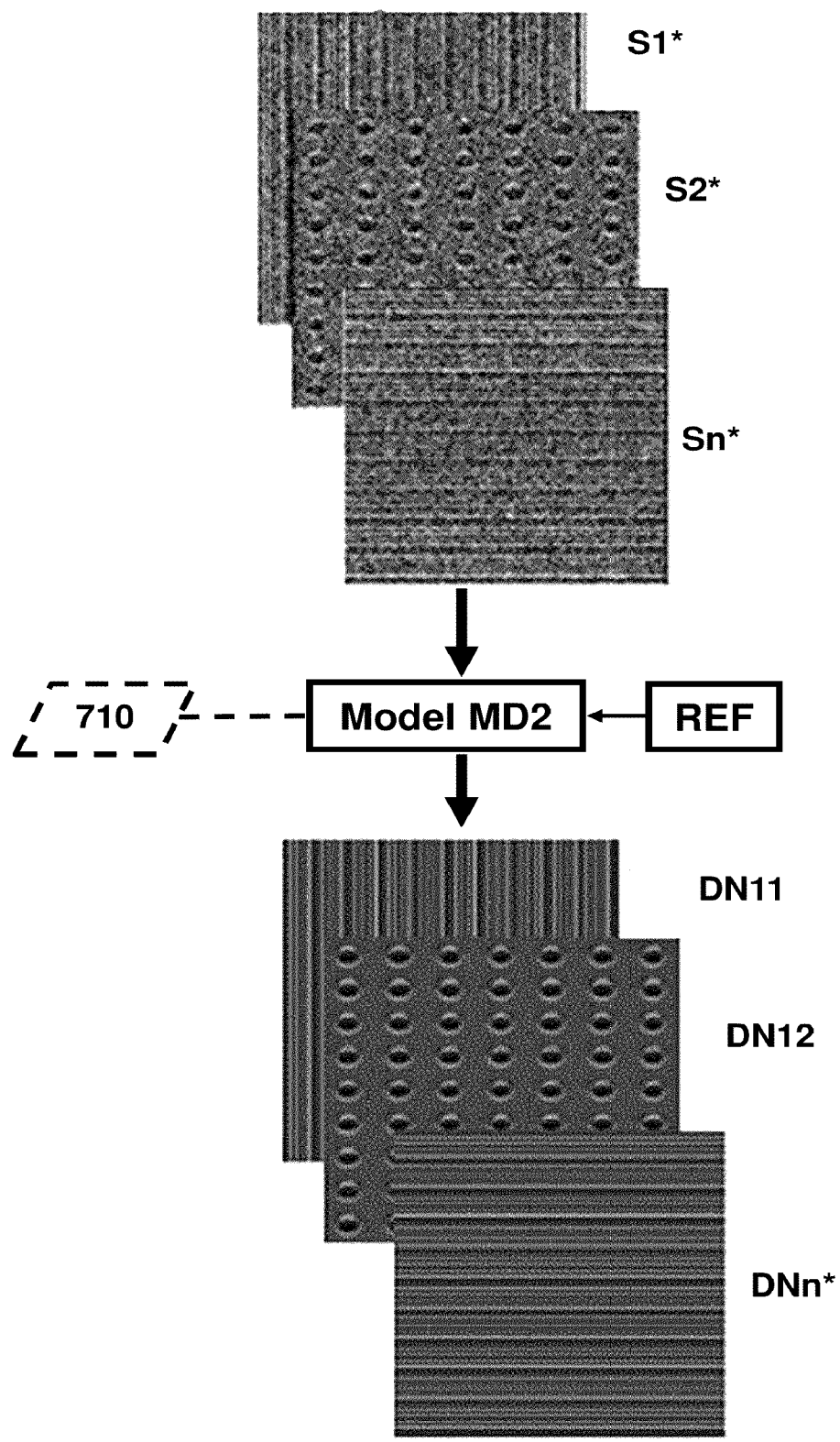
FIG. 7 illustrates an example of training a denoising model, according to some embodiments.

FIG. 7 illustrates an exemplary process of training a denoising model (e.g., MD2), according to some embodiments of the present disclosure.

The first simulated images 201, image noise, and/or reference images REF as training data to train the denoising model MD2. In some embodiments, additionally, captured images 710 (e.g., SEM images) of a patterned substrate may be included in the training data. In some embodiments, the number of captured images 710 can be relatively less than the number of simulated images 201. In some embodiments, the captured images 710 can be used to update a trained denoising model MD2.

In some embodiments, the model MD2 can take as input, for example, noisy images S1*, S2*, Sn* (e.g., generated using the model MD1) and image noise discussed with respect to FIGS. 6 and 7. The model MD2 outputs denoised images such as images DN11, DN12, . . . DNn. During the training process, one or more model parameters (e.g., weights and biases of different layers of DCNN) of the model MD2 may be modified until convergence is achieved or the denoised images are within a specified threshold of reference images REF. In some embodiments, convergence is achieved when changing model parameter values do not cause significant improvement in the model output compared to a prior model output.

In some embodiments, the method 200 further includes obtaining, via a metrology tool, a SEM image of a patterned substrate; and executing the trained denoising model MD2 using the SEM image as the input image to generate the denoised SEM image.

In some embodiments, the second machine leaning model MD2 may also be trained using GAN training method, as discussed above, using the inputs discussed in process P203. For example, using the first simulated images 201, image noise, and reference images REF as training data. In some embodiments, the reference images REF can be the first simulated images 201.

Figure 8:
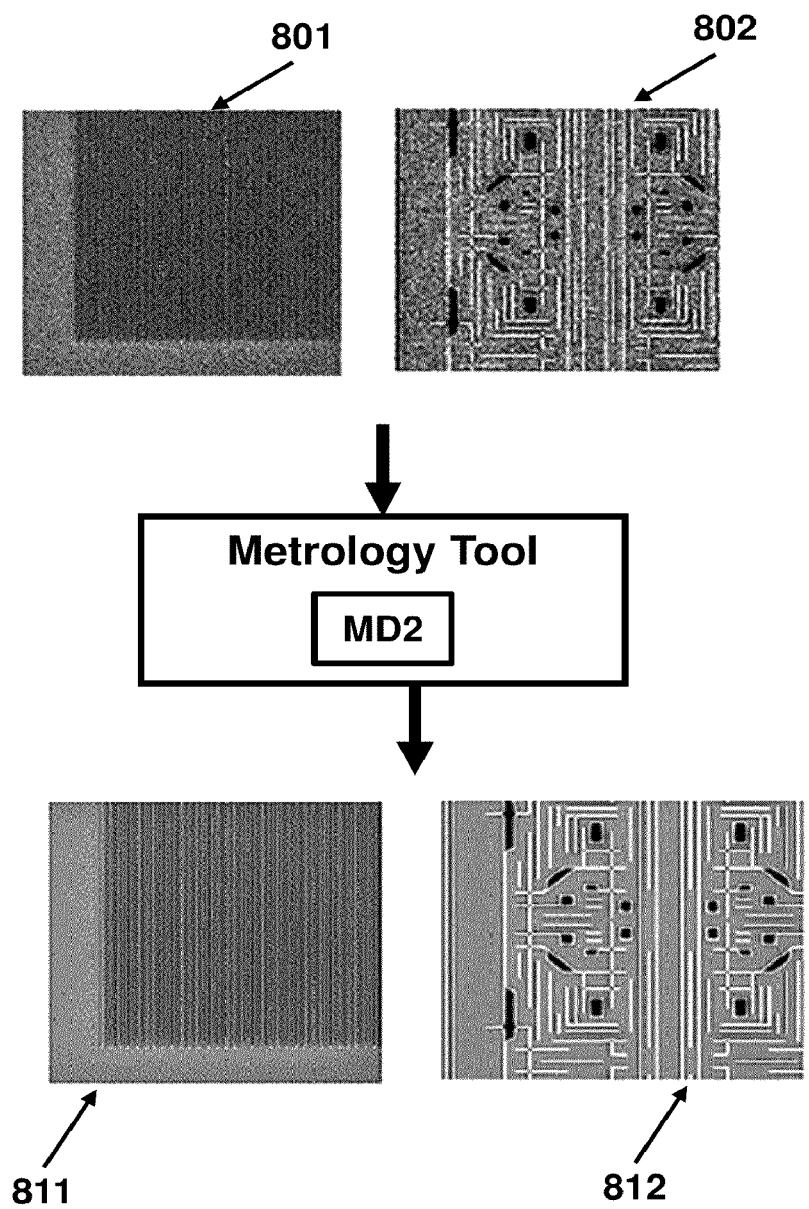
FIG. 8 illustrates an example of the trained denoising model used for generating denoised input SEM images, according to some embodiments.

FIG. 8 illustrates an exemplary process of using the trained denoising model MD2 to generate denoised SEM images. Example SEM images 801 and 802 of a patterned substrate are captured via a SEM tool. Note the SEM image 801 and 802 have very different and complex patterns than used patterns in images in the training data. As the trained model MD2 is trained based on simulated images related to design patterns, a large number of patterns can be advantageously covered. As such, the trained model MD2 is able to generate highly accurate denoised images 811 and 812 of the SEM images 801 and 802, respectively. The results in FIG. 8 show that the trained model MD2 can handle new patterns without additional training. In some embodiments, further fine-tuning of the denoising model MD2 can be performed using the newly captured SEM images to further improve a quality of the denoised images.

Figure 3:
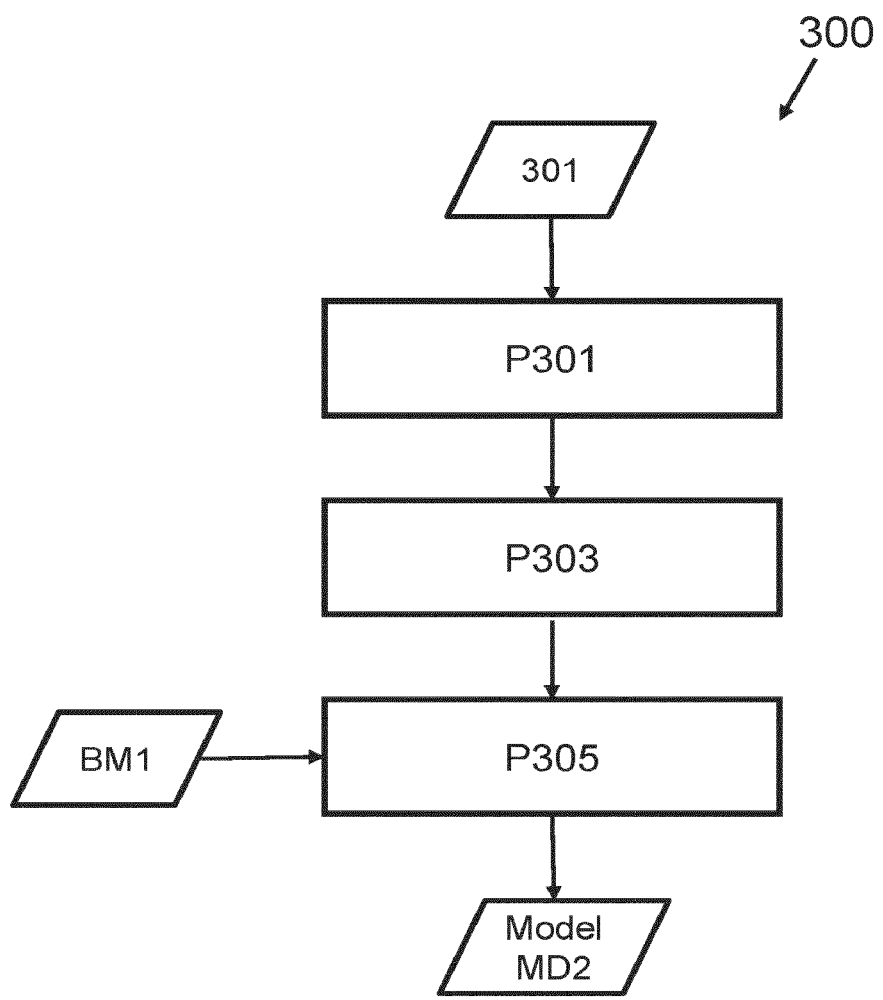
FIG. 3 is a flow chart for a variation of a method for training a denoising model, according to some embodiments.

FIG. 3 is a flow chart of another exemplary method 300 for generating a denoising model according to some embodiments of the present disclosure. The method 300 includes process P301, P303 and P305 discussed below.

Process P301 includes obtaining a first set of simulated images 301 based on design patterns.

In some embodiments, each image of the first set of simulated images 301 is a combination of a simulated SEM image and an image noise (e.g., see S1*, S2*, . . . Sn* in FIG. 6).

In some embodiments, the obtaining of the simulated SEM images includes executing a trained model using the design patterns as input to generate the simulated SEM images. For example, executing the trained model MD1 as discussed with respect to FIG. 5. In some embodiments, the trained model (e.g., MD1) is trained based on the design patterns and captured images of a patterned substrate, wherein each captured image is associated with a design pattern. In some embodiments, the captured images are SEM images acquired via a scanning electron microscope (SEM). In some embodiments, the image noise is noise extracted from the captured images of the patterned substrate. In some embodiments, the image noise is a Gaussian noise, white noise, salt and paper noise characterized by user specified parameters.

In some embodiments, the trained model (e.g., MD1) is a first machine learning model. In some embodiments, the first machine learning model is a CNN or a DCNN trained using a generative adversarial network. In some embodiments, the trained model MD1 is a generative model configured to generate the simulated SEM image for a given design pattern. For example, the trained model MD1, as discussed with respect to FIGS. 5 and 6. In some embodiments, the reference denoised images are the simulated SEM images associated with the design patterns. For example, the reference images can be S1, S2, Sn generated by MD1 of FIG. 5.

Process P303 includes providing the first set of simulated images 301 as input to a base denoising model BM1 to obtain an initial second set of simulated images, the initial second set of simulated images being denoised images associated with the design patterns. In some embodiments, the base model is can be an untrained model or a trained model that needs to be fine-tuned. In some embodiments, captured images of a patterned substrate may also be used for training or fine-tuning the denoising model. Process P305 includes using reference denoised images as feedback to update one or more configurations of the base denoising model BM1. The one or more configurations are updated based on a comparison between the reference denoised images and the second set of simulated images. For example, updating the one or more configurations includes modifying model parameters of the base model. At the end of the training process, the base model with the updated configuration becomes the denoising model. Such denoising model can generate the second set of simulated images using SEM images as input, for example.

In some embodiments, the denoising model is a second machine learning model. In some embodiments, the second deep learning model is trained using a deep leaning method or a machine learning method. In some embodiments, the denoising model may also be trained using a generative adversarial network training method. In some embodiments, the denoising model is a convolutional neural network, or other machine learning models. In some embodiments, the denoising model is MD2, as discussed with respect to FIG. 7.

As discussed herein, an example of a denoising model is a machine learning model. Both unsupervised machine learning and supervised machine learning models may be used to generate denoised images from an input noisy images such as SEM of a patterned substrate. Without limiting the scope of the invention, applications of supervised machine learning algorithms are described below.

Supervised learning is the machine learning task of inferring a function from labeled training data. The training data includes a set of training examples. In supervised learning, each example is a pair having an input object (typically a vector) and a desired output value (also called the supervisory signal). A supervised learning algorithm analyzes the training data and produces an inferred function, which can be used for mapping new examples. An optimal scenario will allow the algorithm to correctly determine the class labels for unseen instances. This requires the learning algorithm to generalize from the training data to unseen situations in a "reasonable" way.

Given a set of N training examples of the form $\{(x_1, y_1),(x_2, y_2), \ldots (x_N, y_N)\}$ such that $x_i$ is the feature vector of the i-th example and $y_i$ is its label (i.e., class), a learning algorithm seeks a function $g:X \to Y$, where X is the input space and Y is the output space. A feature vector is an n-dimensional vector of numerical features that represent some object. Many algorithms in machine learning require a numerical representation of objects, since such representations facilitate processing and statistical analysis. When representing images, the feature values might correspond to the pixels of an image, when representing texts perhaps term occurrence frequencies. The vector space associated with these vectors is often called the feature space. The function g is an element of some space of possible functions G, usually called the hypothesis space. It is sometimes convenient to represent g using a scoring function $f:X \times Y \to \mathbb{R}$ such that g is defined as returning the Y value that gives the highest score:

$$g(x) = \underset{y}{\operatorname{argmax}} f(x, y).$$

Let F denote the space of scoring functions.

Although G and F can be any space of functions, many learning algorithms are probabilistic models where g takes the form of a conditional probability model $g(x)=P(y|x')$, or f takes the form of a joint probability model $f(x,y)=P(x,y)$. For example, naïve Bayes and linear discriminant analysis are joint probability models, whereas logistic regression is a conditional probability model.

There are two basic approaches to choosing f or g: empirical risk minimization and structural risk minimization. Empirical risk minimization seeks the function that best fits the training data. Structural risk minimization includes a penalty function that controls the bias/variance tradeoff.

In both cases, it is assumed that the training set has a sample of independent and identically distributed pairs $(x_i, y_i)$. In order to measure how well a function fits the training data, a loss function $L:Y \times Y \to \mathbb{R} \geq 0$ is defined. For training example $(x_i, y_i)$, the loss of predicting the value $\hat{y}$ is $L(y_i, \hat{y})$.

The risk R(g) of function g is defined as the expected loss of g. This can be estimated from the training data as $$R_{emp}(g) = \frac{1}{N}\sum_{i} L(y_i, g(x_i)).$$

Exemplary models of supervised learning include decision trees, ensembles (bagging, boosting, random forest), k-NN, linear regression, naive Bayes, neural networks, logistic regression, perceptron, support vector machine (SVM), relevance vector machine (RVM), and deep learning.

SVM is an example of supervised learning model, which analyzes data and recognizes patterns and can be used for classification and regression analysis. Given a set of training examples, each marked as belonging to one of two categories, a SVM training algorithm builds a model that assigns new examples into one category or the other, making it a non-probabilistic binary linear classifier. A SVM model is a representation of the examples as points in space, mapped so that the examples of the separate categories are divided by a clear gap that is as wide as possible. New examples are then mapped into that same space and predicted to belong to a category based on which side of the gap they fall on.

In addition to performing linear classification, SVMs can efficiently perform a non-linear classification using what is called the kernel methods, implicitly mapping their inputs into high-dimensional feature spaces.

Kernel methods involve a user-specified kernel, i.e., a similarity function over pairs of data points in raw representation. Kernel methods owe their name to the use of kernel functions, which enable them to operate in a high-dimensional, implicit feature space without ever computing the coordinates of the data in that space, but rather by simply computing the inner products between the images of all pairs of data in the feature space. This operation is often computationally cheaper than the explicit computation of the coordinates. This approach is called the "kernel trick."

The effectiveness of SVM depends on the selection of kernel, the kernel's parameters, and soft margin parameter C. A common choice is a Gaussian kernel, which has a single parameter γ. The best combination of C and y is often selected by a grid search (also known as "parameter sweep") with exponentially growing sequences of C and γ, for example, $C \in \{2^{-5}, 2^{-4}, \ldots, 2^{15}, 2^{10}\}$; $\gamma \in \{2^{-15}, 2^{-14}, \ldots, 2^{4}, 2^{5}\}$.

A grid search is an exhaustive searching through a manually specified subset of the hyperparameter space of a learning algorithm. A grid search algorithm is guided by some performance metric, typically measured by cross-validation on the training set or evaluation on a held-out validation set.

Each combination of parameter choices may be checked using cross validation, and the parameters with best cross-validation accuracy are picked.

Cross-validation, sometimes called rotation estimation, is a model validation technique for assessing how the results of a statistical analysis will generalize to an independent data set. It is mainly used in settings where the goal is prediction, and one wants to estimate how accurately a predictive model will perform in practice. In a prediction problem, a model is usually given a dataset of known data on which training is run (training dataset), and a dataset of unknown data (or first seen data) against which the model is tested (testing dataset). The goal of cross validation is to define a dataset to "test" the model in the training phase (i.e., the validation dataset), in order to limit problems like overfitting, give an insight on how the model will generalize to an independent data set (i.e., an unknown dataset, for instance from a real problem), etc. One round of cross-validation involves partitioning a sample of data into complementary subsets, performing the analysis on one subset (called the training set), and validating the analysis on the other subset (called the validation set or testing set). To reduce variability, multiple rounds of cross-validation are performed using different partitions, and the validation results are averaged over the rounds.

The final model, which can be used for testing and for classifying new data, is then trained on the entire training set using the selected parameters.

Another example of supervised learning is regression. Regression infers the relationships between a dependent variable and one or more independent variables, from a set of values of the dependent variables and corresponding values of the independent variables. Regression may estimate the conditional expectation of the dependent variable given the independent variables. The inferred relationships may be called the regression function. The inferred relationships may be probabilistic.

In some embodiments, there is provided a system that can use the model MD2 to generate denoised images after the system captures images of a patterned substrate. In some embodiments, the system can be, for example, a SEM tool of FIG. 9 or an inspection tool of FIG. 10 that are configured to include the model MD1 and/or MD2 discussed herein. For example, the metrology tool includes an e-beam generator to capture an image of a patterned substrate; and one or more processors including the MD1 and MD2 model. The one or more processors are configured to execute a trained model configured to generate a simulated image based on a design pattern used to pattern the substrate; and execute a denoising model using the captured image and the simulated image as input to generate a denoised image of the patterned substrate. As mentioned earlier, the denoising model (e.g., MD2) is a convolutional neural network.

Furthermore, in some embodiments, the one or more processors is further configured to update the denoising model based on a captured image of a patterned substrate. In some embodiments, the updating of the denoising model includes execute the denoising model using the captured to generate the denoised image; and update one or more parameters of the denoising model based on a comparison of the denoised image with a reference denoised image.

The present disclosure is not limited to any applications that use denoised images. In the semiconductor industry, the denoised images can be used for inspection and metrology for example. In some embodiments, the denoised images can be used to determine hot spots of patterned substrate. Hot spots may be determined based on absolute CD values measured from the denoised image. Alternatively, hot spots may be determined based on a set of predetermined rules such as those used in a design rule checking system, including, but not limited to, line-end pullback, corner rounding, proximity to neighboring features, pattern necking or pinching, and other metrics of pattern deformation relative to the desired pattern.

In some embodiments, the denoised images can be used to improve patterning process. For example, the denoised images can be used in simulation of the patterning process, for example, to predict contours, CDs, edge placement (e.g., edge placement error), etc. in the resist and/or etched image. The objective of the simulation is to accurately predict, for example, edge placement, and/or aerial image intensity slope, and/or CD, etc. of the printed pattern. These values can be compared against an intended design to, e.g., correct the patterning process, identify where a defect is predicted to occur, etc. The intended design is generally defined as a pre-OPC design layout which can be provided in a standardized digital file format such as GDSII or OASIS or other file format.

Figure 9:
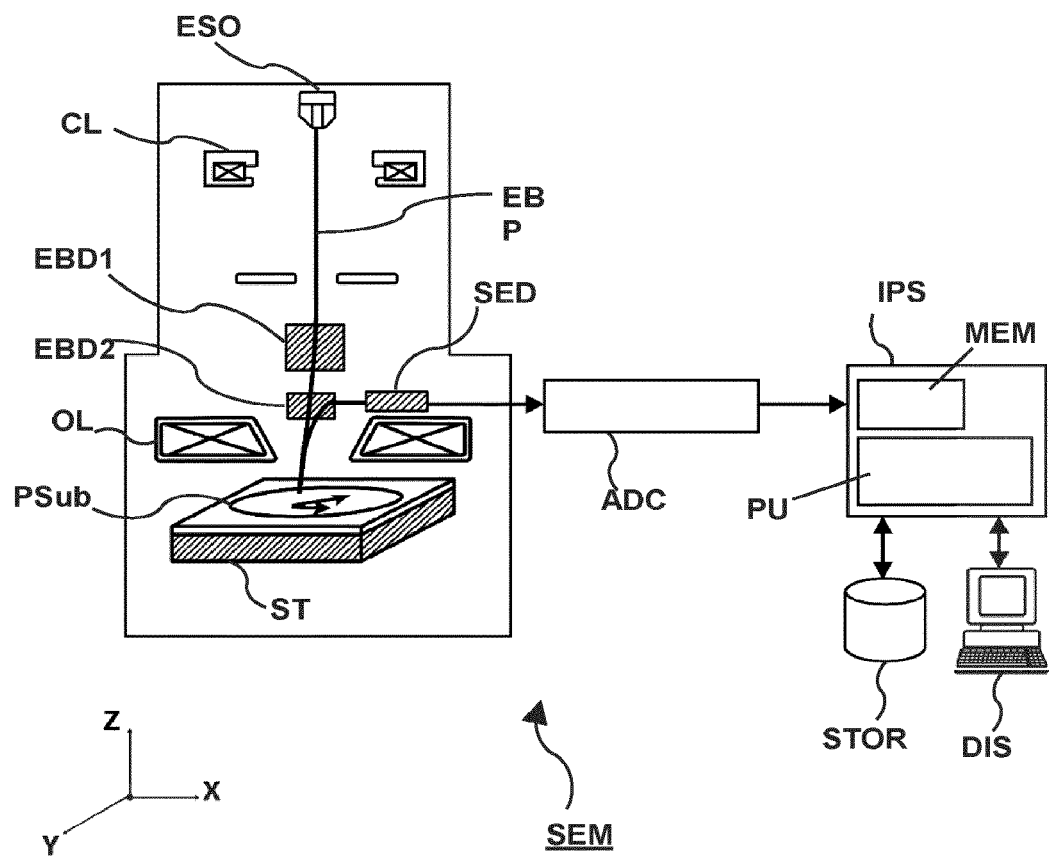
FIG. 9 schematically depicts an example of a scanning electron microscope (SEM), according to some embodiments.

In some embodiments, the inspection apparatus or the metrology apparatus may be a scanning electron microscope (SEM) that yields an image of a structure (e.g., some or all the structure of a device) exposed or transferred on the substrate. FIG. 9 depicts an example of a SEM tool. A primary electron beam EBP emitted from an electron source ESO is converged by condenser lens CL and then passes through a beam deflector EBD1, an E×B deflector EBD2, and an objective lens OL to irradiate a substrate PSub on a substrate table ST at a focus.

When the substrate PSub is irradiated with electron beam EBP, secondary electrons are generated from the substrate PSub. The secondary electrons are deflected by the E×B deflector EBD2 and detected by a secondary electron detector SED. A two-dimensional electron beam image can be obtained by detecting the electrons generated from the sample in synchronization with, e.g., two dimensional scanning of the electron beam by beam deflector EBD1 or with repetitive scanning of electron beam EBP by beam deflector EBD1 in an X or Y direction, together with continuous movement of the substrate PSub by the substrate table ST in the other of the X or Y direction.

A signal detected by secondary electron detector SED is converted to a digital signal by an analog/digital (A/D) converter ADC, and the digital signal is sent to an image processing system IPU. In some embodiments, the image processing system IPU may have memory MEM to store all or part of digital images for processing by a processing unit PU. The processing unit PU (e.g., specially designed hardware or a combination of hardware and software) is configured to convert or process the digital images into datasets representative of the digital images. Further, image processing system IPU may have a storage medium STOR configured to store the digital images and corresponding datasets in a reference database. A display device DIS may be connected with the image processing system IPU, so that an operator can conduct necessary operation of the equipment with the help of a graphical user interface.

As noted above, SEM images may be processed to extract contours that describe the edges of objects, representing device structures, in the image. These contours are then quantified via metrics, such as CD. Thus, typically, the images of device structures are compared and quantified via simplistic metrics, such as an edge-to-edge distance (CD) or simple pixel differences between images. Typical contour models that detect the edges of the objects in an image in order to measure CD use image gradients. Indeed, those models rely on strong image gradients. But, in practice, the image typically is noisy and has discontinuous boundaries. Techniques, such as smoothing, adaptive thresholding, edge-detection, erosion, and dilation, may be used to process the results of the image gradient contour models to address noisy and discontinuous images, but will ultimately result in a low-resolution quantification of a high-resolution image. Thus, in most instances, mathematical manipulation of images of device structures to reduce noise and automate edge detection results in loss of resolution of the image, thereby resulting in loss of information. Consequently, the result is a low-resolution quantification that amounts to a simplistic representation of a complicated, high-resolution structure.

So, it is desirable to have a mathematical representation of the structures (e.g., circuit features, alignment mark or metrology target portions (e.g., grating features), etc.) produced or expected to be produced using a patterning process, whether, e.g., the structures are in a latent resist image, in a developed resist image or transferred to a layer on the substrate, e.g., by etching, that can preserve the resolution and yet describe the general shape of the structures. In the context of lithography or other patterning processes, the structure may be a device or a portion thereof that is being manufactured and the images may be SEM images of the structure. In some instances, the structure may be a feature of semiconductor device, e.g., integrated circuit. In this case, the structure may be referred as a pattern or a desired pattern that comprises a plurality of feature of the semiconductor device. In some instances, the structure may be an alignment mark, or a portion thereof (e.g., a grating of the alignment mark), that is used in an alignment measurement process to determine alignment of an object (e.g., a substrate) with another object (e.g., a patterning device) or a metrology target, or a portion thereof (e.g., a grating of the metrology target), that is used to measure a parameter (e.g., overlay, focus, dose, etc.) of the patterning process. In some embodiments, the metrology target is a diffractive grating used to measure, e.g., overlay.

Figure 10:
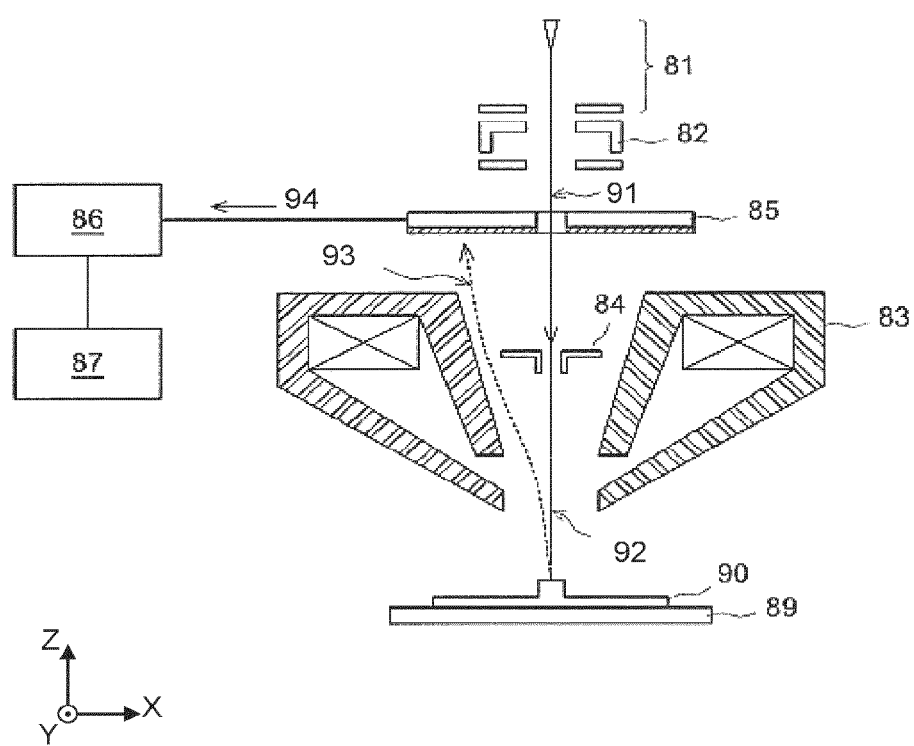
FIG. 10 schematically depicts an example of an electron beam inspection apparatus, according to some embodiments.

FIG. 10 schematically illustrates a further example of an inspection apparatus. The system is used to inspect a sample 90 (such as a substrate) on a sample stage 88 and comprises a charged particle beam generator 81, a condenser lens module 82, a probe forming objective lens module 83, a charged particle beam deflection module 84, a secondary charged particle detector module 85, and an image forming module 86.

The charged particle beam generator 81 generates a primary charged particle beam 91. The condenser lens module 82 condenses the generated primary charged particle beam 91. The probe forming objective lens module 83 focuses the condensed primary charged particle beam into a charged particle beam probe 92. The charged particle beam deflection module 84 scans the formed charged particle beam probe 92 across the surface of an area of interest on the sample 90 secured on the sample stage 88. In some embodiments, the charged particle beam generator 81, the condenser lens module 82 and the probe forming objective lens module 83, or their equivalent designs, alternatives or any combination thereof, together form a charged particle beam probe generator which generates the scanning charged particle beam probe 92.

The secondary charged particle detector module 85 detects secondary charged particles 93 emitted from the sample surface (maybe also along with other reflected or scattered charged particles from the sample surface) upon being bombarded by the charged particle beam probe 92 to generate a secondary charged particle detection signal 94. The image forming module 86 (e.g., a computing device) is coupled with the secondary charged particle detector module 85 to receive the secondary charged particle detection signal 94 from the secondary charged particle detector module 85 and accordingly forming at least one scanned image. In some embodiments, the secondary charged particle detector module 85 and image forming module 86, or their equivalent designs, alternatives or any combination thereof, together form an image forming apparatus which forms a scanned image from detected secondary charged particles emitted from sample 90 being bombarded by the charged particle beam probe 92.

In some embodiments, a monitoring module 87 is coupled to the image forming module 86 of the image forming apparatus to monitor, control, etc. the patterning process and/or derive a parameter for patterning process design, control, monitoring, etc. using the scanned image of the sample 90 received from image forming module 86. So, in some embodiments, the monitoring module 87 is configured or programmed to cause execution of a method described herein. In some embodiments, the monitoring module 87 comprises a computing device. In some embodiments, the monitoring module 87 comprises a computer program to provide functionality herein and encoded on a computer readable medium forming, or disposed within, the monitoring module 87.

In some embodiments, like the electron beam inspection tool of FIG. 9 that uses a probe to inspect a substrate, the electron current in the system of FIG. 10 is significantly larger compared to, e.g., a CD SEM such as depicted in FIG. 9, such that the probe spot is large enough so that the inspection speed can be fast. However, the resolution may not be as high as compared to a CD SEM because of the large probe spot. In some embodiments, the above discussed inspection apparatus may be single beam or a multi-beam apparatus without limiting the scope of the present disclosure.

The SEM images, from, e.g., the system of FIG. 9 and/or FIG. 10, may be processed to extract contours that describe the edges of objects, representing device structures, in the image. These contours are then typically quantified via metrics, such as CD, at user-defined cut-lines. Thus, typically, the images of device structures are compared and quantified via metrics, such as an edge-to-edge distance (CD) measured on extracted contours or simple pixel differences between images.

In some embodiments, the one or more procedures of the process 200, and/or 300 can be implemented as instructions (e.g., program code) in a processor of a computer system (e.g., process 104 of computer system 100). In some embodiments, the procedures may be distributed across a plurality of processors (e.g., parallel computation) to improve computing efficiency. In some embodiments, the computer program product comprising a non-transitory computer readable medium has instructions recorded thereon, the instructions when executed by a computer hardware system implementing the method described herein.

According to present disclosure, the combination and sub-combinations of disclosed elements constitute separate embodiments. For example, a first combination includes determining a denoising model based on simulated images related to design patterns and noise image. The sub-combination may include determining a denoised image using the denoising model. In another combination, the denoised images can be employed in an inspection process, determining OPC, or SMO based on model-generated variance data. In another example, the combination includes determining, based on inspection data based on the denoised images, process adjustments to a lithography process, resist process, or etch process to improve the yield of the patterning process.

Figure 11:
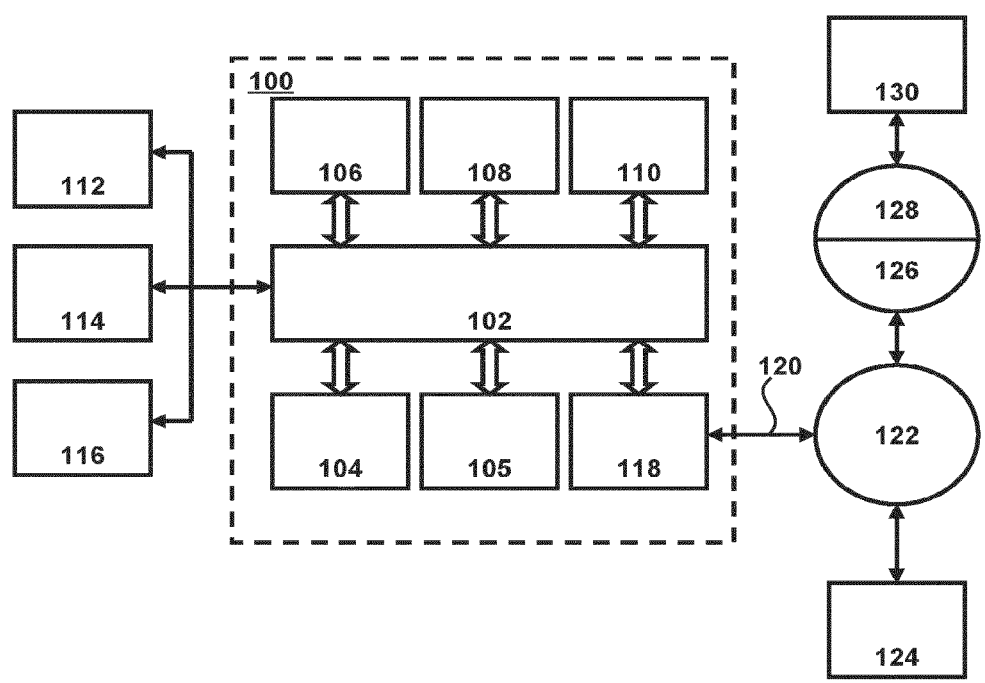
FIG. 11 is a block diagram of an example computer system, according to some embodiments.

FIG. 11 is a block diagram that illustrates a computer system 100 which can assist in implementing the methods, flows or the apparatus disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to some embodiments, portions of one or more methods described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In some embodiments, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions.

The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide all or part of a method described herein, for example. The received code may be executed by processor 104 as it is received, and/or stored in storage device 110, or other non-volatile storage for later execution. In this manner, computer system 100 may obtain application code in the form of a carrier wave.

Figure 12:
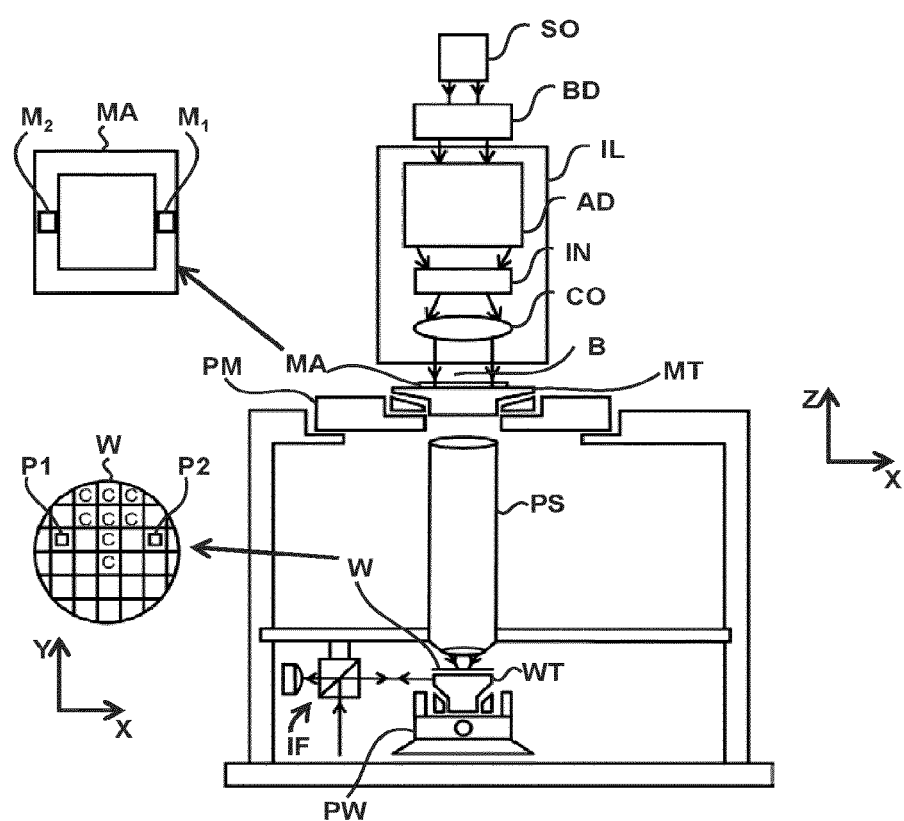
FIG. 12 is a schematic diagram of a lithographic projection apparatus, according to some embodiments.

FIG. 12 schematically depicts an exemplary lithographic projection apparatus in conjunction with the techniques described herein can be utilized. The apparatus comprises:

an illumination system IL, to condition a beam B of radiation. In this particular case, the illumination system also comprises a radiation source SO;

a first object table (e.g., patterning device table) MT provided with a patterning device holder to hold a patterning device MA (e.g., a reticle), and connected to a first positioner to accurately position the patterning device with respect to item PS;

a second object table (substrate table) WT provided with a substrate holder to hold a substrate W (e.g., a resist-coated silicon wafer), and connected to a second positioner to accurately position the substrate with respect to item PS;

a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 12 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or F2 lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 12. However, in the case of a stepper (as opposed to a step-and-scan tool) the patterning device table MT may just be connected to a short stroke actuator or may be fixed.

The depicted tool can be used in two different modes:

In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 13:
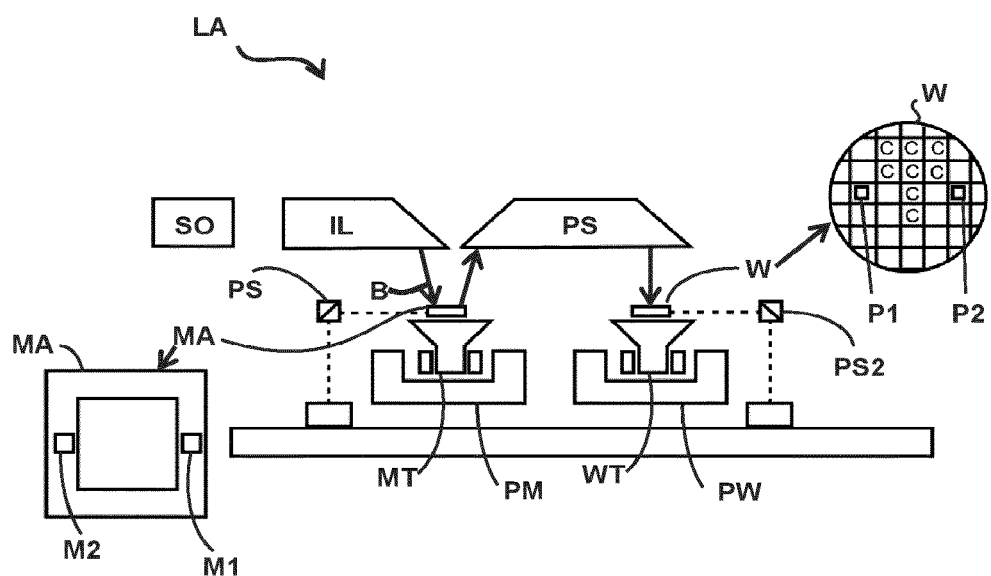
FIG. 13 is a schematic diagram of another lithographic projection apparatus, according to some embodiments.

FIG. 13 schematically depicts another exemplary lithographic projection apparatus LA in conjunction with the techniques described herein can be utilized.

The lithographic projection apparatus LA comprises:
a source collector module SO
an illumination system (illuminator) IL configured to condition a radiation beam B (e.g. EUV radiation).
a support structure (e.g. a patterning device table) MT constructed to support a patterning device (e.g. a mask or a reticle) MA and connected to a first positioner PM configured to accurately position the patterning device;
a substrate table (e.g. a wafer table) WT constructed to hold a substrate (e.g. a resist coated wafer) W and connected to a second positioner PW configured to accurately position the substrate; and
a projection system (e.g. a reflective projection system) PS configured to project a pattern imparted to the radiation beam B by patterning device MA onto a target portion C (e.g. comprising one or more dies) of the substrate W.

As here depicted, the apparatus LA is of a reflective type (e.g. employing a reflective patterning device). It is to be noted that because most materials are absorptive within the EUV wavelength range, the patterning device may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 13, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 13, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., patterning device table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus LA could be used in at least one of the following modes:

1. In step mode, the support structure (e.g. patterning device table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. patterning device table) MT and the substrate table WT are scanned synchronously while a pattern imparted to the radiation beam is projected onto a target portion C (i.e. a single dynamic exposure). The velocity and direction of the substrate table WT relative to the support structure (e.g. patterning device table) MT may be determined by the (de-)magnification and image reversal characteristics of the projection system PS.

3. In another mode, the support structure (e.g. patterning device table) MT is kept essentially stationary holding a programmable patterning device, and the substrate table WT is moved or scanned while a pattern imparted to the radiation beam is projected onto a target portion C. In this mode, generally a pulsed radiation source is employed, and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 14:
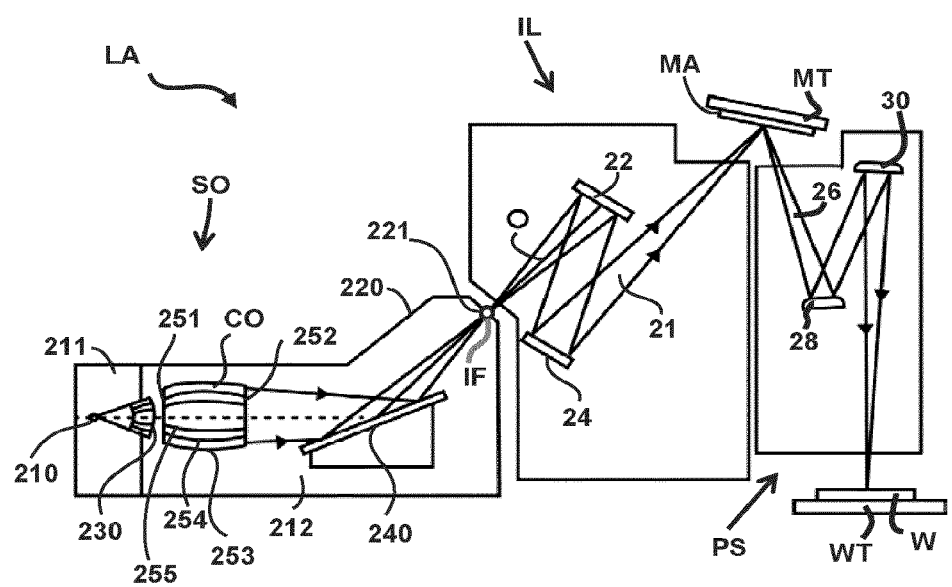
FIG. 14 is a more detailed view of the apparatus in FIG. 12, according to some embodiments.

FIG. 14 shows the apparatus LA in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In some embodiments, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line '0'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 14.

Collector optic CO, as illustrated in FIG. 14, is depicted as a nested collector with grazing incidence reflectors 253, 254 and 255, just as an example of a collector (or collector mirror). The grazing incidence reflectors 253, 254 and 255 are disposed axially symmetric around the optical axis 0 and a collector optic CO of this type may be used in combination with a discharge produced plasma source, often called a DPP source.

Figure 15:
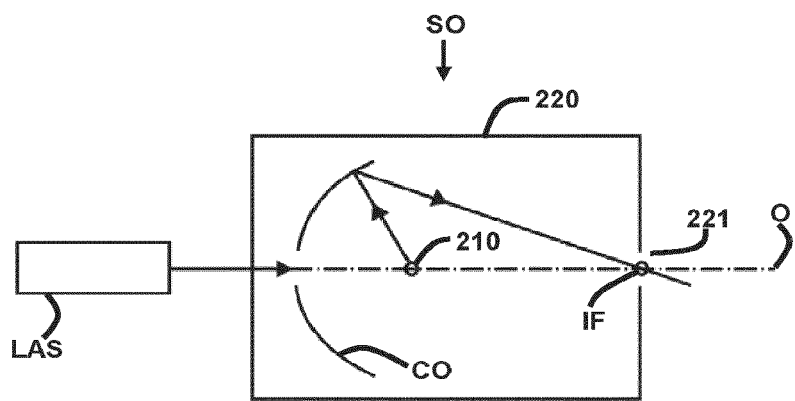
FIG. 15 is a more detailed view of the source collector module SO of the apparatus of FIG. 13 and FIG. 14, according to some embodiments.

Alternatively, the source collector module SO may be part of an LPP radiation system as shown in FIG. 15. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The concepts disclosed herein may simulate or mathematically model any generic imaging system for imaging sub wavelength features and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

Embodiments of the present disclosure can be further described by the following clauses.

1. One or more non-transitory, computer-readable media storing a denoising model and generating a denoised image via the denoising model instructions that, when executed by one or more processors, provides the denoising model, the denoising model being produced by: converting design patterns to a first set of simulated images; providing the first set of simulated images as input to a base denoising model to obtain a second set of simulated images, the second set of simulated images being denoised images associated with the design patterns; and using reference denoised images as feedback to update one or more configurations of the base denoising model, wherein the one or more configurations are updated based on a comparison between the reference denoised images and the second set of simulated images.
2. The media of clause 1, wherein each image of the first set of simulated images is a combination of a simulated SEM image and an image noise.
3. The media of clause 2, wherein the converting design patterns comprises: executing a trained model using the design patterns as input to generate the simulated SEM images.
4. The media of clause 3, wherein the trained model is trained based on the design patterns and captured images of a patterned substrate, each captured image being associated with a design pattern.
5. The media of clause 4, wherein the captured images are SEM images acquired via a scanning electron microscope (SEM).
6. The media of clause 5, wherein the image noise is noise extracted from the captured images of the patterned substrate.
7. The media of any of clauses 3-6, the trained model is a first machine leaning model.
8. The media of clause 7, wherein the trained model is a convolutional neural network or a deep convolutional neural network trained using a generative adversarial network.
9. The media of clause 8, wherein the trained model is a generative model configured to generate the simulated SEM image for a given design pattern.
10. The media of any of clauses 2-9, wherein the image noise is a Gaussian noise, white noise, salt and paper noise characterized by user specified parameters.
11. The media of any of clauses 2-10, wherein the reference denoised images are the simulated SEM images associated with the design patterns.
12. The media of any of clauses 1-11, wherein the denoising model is a second machine leaning model.
13. The media of any of clauses 1-12, wherein the denoising model is a convolutional neural network or a deep convolutional neural network.
14. The media of any of clauses 1-13, wherein the design patterns are in Graphic Data Signal (GDS) file format.
15. A system comprising:
e-beam optics configured to capture an image of a patterned substrate; and one or more processors configured to:
execute a denoising model using the captured image as input to generate a denoised image of the patterned substrate.

16. The system of clause 15, wherein the denoising model is a convolutional neural network.
17. The system of any of clauses 15-16, the one or more processors is further configured to: execute a trained model using a design pattern provided in Graphic Data Signal (GDS) file format to generate a simulated image.
18. The system of any of clauses 15-17, wherein the one or more processors is further configured to:
update the denoising model based on the captured image of the patterned substrate.
19. The system of any of clauses 15-18, wherein the one or more processors is further configured to: update one or more parameters of the denoising model based on a comparison of the denoised image with a reference denoised image.
20. The system of any of clauses 15-19, wherein the denoising model is produced by: converting design patterns to a first set of simulated images;
providing the first set of simulated images as input to a base denoising model to obtain a second set of simulated images, the second set of simulated images being denoised images associated with the design patterns; and
using reference denoised images as feedback to update one or more configurations of the base denoising model, wherein the one or more configurations are updated based on a comparison between the reference denoised images and the second set of simulated images.
21. The system of clause 20, wherein each image of the first set of simulated images is a combination of a simulated SEM image and an image noise.
22. A method for training a denoising model, the method comprising: converting design pattern to a first set of simulated images; and training the denoising model based on the first set of simulated images and an image noise, wherein the denoising model is operable to generate a denoised image of an input image.
23. The method of clause 22, wherein the converting the design patterns to the first set of simulated images comprises:
executing a trained model using the design patterns as an input to generate the simulated images.
24. The method of clause 23, wherein the trained model is trained based on the design patterns and captured images of a patterned substrate, each captured image being associated with a design pattern.
25. The method of clause 24, wherein the captured images are SEM images acquired via a scanning electron microscope (SEM).
26. The method of clause 25, further comprising adding the image noise to the first set of simulated images to generate a second set of simulated images, wherein the image noise is extracted from the captured images of the patterned substrate.
27. The method of clause 26, wherein the training the denoising model comprises using the first set of simulated image, the image noise, and captured images as training data.
28. The method of any of clauses 23-27, the trained model is a first machine leaning model.
29. The method of clause 28, wherein the trained model is a convolutional neural network or a deep convolutional neural network trained using a generative adversarial network training method.
30. The method of clause 29, wherein the trained model is a generative model configured to generate a simulated SEM image for a given design pattern.
31. The method of any of clauses 22-30, wherein the image noise is a Gaussian noise, white noise, salt and paper noise characterized by user specified parameters.
32. The method of any of clauses 23-31, wherein the denoising model is a second machine leaning model.
33. The method of any of clauses 22-32, wherein the denoising model is a convolutional neural network.
34. The method of any of clauses 22-33, wherein the design patterns are in Graphic Data Signal (GDS) file format.
35. The method of any of clauses 22-24, further comprising: obtaining, via a metrology tool, a SEM image of a patterned substrate; and executing the trained denoising model using the SEM image as the input image to generate the denoised SEM image.
36. One or more non-transitory, computer-readable media storing a denoising model and generating a denoised image via the denoising model instructions that, when executed by one or more processors, provides the denoising model, the denoising model being produced by: converting design patterns to a first set of simulated images; and
training the denoising model based on the first set of simulated images and an image noise, wherein the denoising model is operable to generate a denoised image of an input image.
37. The media of clause 36, wherein the converting comprises: executing a trained model using the design patterns as an input to generate the simulated images.
38. The media of clause 37, wherein the trained model is trained based on the design patterns and captured images of a patterned substrate, each captured image being associated with a design pattern.
39. The media of clause 38, wherein the captured images are SEM images acquired via a scanning electron microscope (SEM).
40. The media of clause 39, further comprising adding the image noise to the first set of simulated images to generate a second set of simulated images, wherein the image noise is extracted from the captured images of the patterned substrate.
41. The media of any of clauses 37-40, the trained model is a first machine leaning model.
42. The media of clause 41, wherein the trained model is a convolutional neural network or a deep convolutional neural network trained using a generative adversarial network training method.
43. The media of clause 42, wherein the trained model is a generative model configured to generate a simulated SEM image for a given design pattern.
44. The media of any of clauses 36-43, wherein the image noise is a Gaussian noise, white noise, salt and paper noise characterized by user specified parameters.
45. The media of any of clauses 36-44, wherein the denoising model is a second machine leaning model.
46. The media of any of clauses 38-45, wherein the training the denoising model comprises using the first set of simulated image, the image noise and the captured images as training data.
47. The media of any of clauses 36-46, wherein the denoising model is a convolutional neural network.
48. The media of any of clauses 36-47, wherein the design patterns are in Graphic Data Signal (GDS) file format.
49. The media of any of clauses 36-48, further comprising:
obtaining, via a metrology tool, a SEM image of a patterned substrate; and
executing the trained denoising model using the SEM image as the input image to generate the denoised SEM image.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

The descriptions above are intended to be illustrative, not limiting. Thus, it will be apparent to one skilled in the art that modifications may be made as described without departing from the scope of the claims set out below.

The invention claimed is:

1. A method for training a denoising model, the method comprising:
   converting a design pattern to a first set of simulated images; and
   training the denoising model using training data comprising the first set of simulated images, an image noise, and captured images, wherein the denoising model is operable to generate a denoised image of an input image.

2. The method of claim 1, wherein the converting the design patterns to the first set of simulated images comprises:
   executing a trained model configured to use the design patterns as an input to generate the simulated images.

3. The method of claim 2, wherein the trained model is trained based on the design patterns and the captured images of a patterned substrate, each captured image being associated with a design pattern.

4. The method of claim 3, wherein the captured images are SEM images acquired via a scanning electron microscope (SEM).

5. The method of claim 4, further comprising adding the image noise to the first set of simulated images to generate a second set of simulated images, wherein the image noise is extracted from the captured images of the patterned substrate.

6. The method of claim 2, wherein the trained model comprises a first machine learning model.

7. The method of claim 6, wherein the trained model comprises a convolutional neural network or a deep convolutional neural network trained using a generative adversarial network training method.

8. The method of claim 7, wherein the trained model is a generative model configured to generate a simulated SEM image for a given design pattern.

9. The method of claim 1, wherein the image noise is a Gaussian noise, white noise, salt and paper noise characterized by user specified parameters.

10. The method of claim 1, wherein the denoising model comprises a second machine learning model.

11. The method of claim 1, wherein the design patterns are in Graphic Data Signal (GDS) file format.

12. The method of claim 1, further comprising:
    obtaining a captured SEM image of a patterned substrate; and
    executing the trained denoising model using the captured SEM image as the input image to generate a denoised SEM image.

13. The method of claim 1, further comprising updating the denoising model based on a captured image of a patterned substrate.

14. One or more non-transitory, computer-readable media storing instructions, that when executed by a processor, causes the processor to perform operations comprising:
    converting a design pattern to a first set of simulated images; and
    training a denoising model using training data comprising the first set of simulated images, an image noise, and captured images, wherein the denoising model is operable to generate a denoised image of an input image.

15. A system comprising:
    e-beam optics configured to capture an image of a patterned substrate; and
    one or more processors configured to:
       execute a denoising model using the captured image as input to generate a denoised image of the patterned substrate, the denoising model having been trained using training data comprising a set of simulated images converted from a design pattern, an image noise, and ground truth data comprising captured images.

16. The system of claim 15, wherein the denoising model is a convolutional neural network.

17. The system of claim 15, the one or more processors is further configured to:
    execute a trained model using the design pattern provided in Graphic Data Signal (GDS) file format to generate the set of simulated images.

18. The system of claim 15, wherein the one or more processors is further configured to:
    update the denoising model based on the captured image of the patterned substrate.

19. The system of claim 15, wherein the one or more processors is further configured to:
    update one or more parameters of the denoising model based on a comparison of the denoised image with a reference denoised image.

* * * * *